United States Patent [19]

Hara et al.

[11] Patent Number: 5,576,793
[45] Date of Patent: Nov. 19, 1996

[54] LENS-FITTED PHOTOGRAPHIC FILM UNIT

[75] Inventors: Hiroshi Hara, Kanagawa; Takuya Arai, Tokyo; Fuyuki Yonehara, Tokyo, all of Japan

[73] Assignee: Fuji Photo Film Co., Ltd., Kanagawa, Japan

[21] Appl. No.: 579,285

[22] Filed: Dec. 27, 1995

Related U.S. Application Data

[62] Division of Ser. No. 203,558, Mar. 1, 1994, Pat. No. 5,537,176.

[30] Foreign Application Priority Data

Mar. 1, 1993 [JP] Japan ................................. 5-40199
Mar. 1, 1993 [JP] Japan ................................. 5-40200

[51] Int. Cl.⁶ .......................... G03B 17/02; G03B 17/26
[52] U.S. Cl. ...................... 396/6; 396/512; 396/538
[58] Field of Search ........................ 354/275, 288, 354/76; 224/908; 206/316.2; 493/395, 352

[56] References Cited

U.S. PATENT DOCUMENTS

| | | |
|---|---|---|
| 3,602,118 | 8/1971 | Oberheim . |
| 3,754,641 | 8/1973 | Koch ........................... 206/45.34 |
| 3,910,470 | 10/1975 | Swenson et al. . |
| 4,138,045 | 2/1979 | Baker . |
| 4,804,984 | 2/1989 | Heuer et al. . |
| 4,804,987 | 2/1989 | Arai . |
| 4,896,178 | 1/1990 | Ohmura et al. . |
| 5,285,228 | 2/1994 | VanDeMoere . |
| 5,311,231 | 5/1994 | Suzuki et al. . |
| 5,350,062 | 9/1994 | Takiguchi et al. . |

*Primary Examiner*—A. A. Mathews
*Attorney, Agent, or Firm*—Young & Thompson

[57] ABSTRACT

A lens-fitted photographic film unit has a film housing, which is preloaded with photographic film and provided with photograph-taking structure. A protuberant portion is formed in front of the film housing. A cardboard packaging covers the film housing. A four-sided portion of the packaging is curved to project outwardly by pressure molding, and fitted on the protuberant portion. In a preferred embodiment, a cassette is contained in the film housing with its axis vertical and is disposed near an end of the film housing, and contains the film after the film has been exposed. The protuberant portion and the four-sided portion are curved about the outside of the cassette, to be used as a grip. Two slits are formed in the packaging and along respective horizontal sides of the four-sided portion, in order partially to expose the protuberant portion. The film housing is black. On the packaging, the edges of the slits are black.

7 Claims, 11 Drawing Sheets

LENS-FITTED PHOTOGRAPHIC FILM UNIT

This is a division of application Ser. No. 08/203,558, filed Mar. 1, 1994, now U.S. Pat. No. 5,537,176.

BACKGROUND OF THE INVENTION

1. Field of the Invention

The present invention relates to a lens-fitted photographic film unit, more particularly to a photographic film unit which is packaged in a form convenient to be held manually.

2. Description of the Prior Art

Lens-fitted photographic film units are on sale under trade names such as "Fujicolor Quick Snap" and "Fujicolor Quick Snap Flash" (manufactured by Fuji Photo Film Co., Ltd.) When one purchases a photographic film unit, it is readily portable and adapted to take photographs whenever desired. After completion of the use of the photographic film in the film unit, the photographic film unit, the photographic film unit is left with a photographic finishing agent without taking out the film.

Various proposals have been made for reducing the cost of manufacturing photographic film units: such film units in general are commercially packaged in an external cardboard packaging provided with printed decoration as well as printed instructions. The packaging also serves as protection. There have been proposals for reducing the overall size of the photographic film units in view of improving their portability.

Such lens-fitted photographic film units are pre-loaded with 135-type photographic film within a cassette. In the course of manufacture of the film unit, the film is drawn out of the cassette, while the withdrawn strip of film is wound in a roll. The unit is sold with the film thus fully withdrawn, the empty cassette with one end of the film attached to its spool being disposed on one side of the exposure frame and the unexposed film wound in a roll being disposed on the other side of the exposure frame. After exposure of each frame of the photo film, an exposed portion of the film one frame in length is wound back into the cassette. There is a problem in making very compact a film unit containing such a cassette, because the ability to reduce in size the photo film unit is limited by the fixed size of the cassette.

Formerly there were only photographic film units whose depth, between their front and rear surfaces, was at least the diameter of the cassette. More recently, it was proposed in U.S. patent application Ser. No. 07/928,703, to construct a photographic film unit having a depth less than the diameter of the cassette. In such a film unit, the body or film housing has a lesser depth, and a cassette-containing portion is partly cylindrical and disposed to cover the front of a contained cassette while protruding to the front beyond the thinner part of the film housing.

However, such a film unit raises a problem in that it is very difficult to cover the protuberant cassette portion with a cardboard packaging. The convenience of a greatly reduced depth of the film unit cannot be enjoyed, because the film housing requires protection by use of the cardboard packaging.

OBJECT OF THE INVENTION

In view of the foregoing problems, an object of the present invention is to provide a lens-fitted photographic film unit which is easy to package despite a protuberant portion.

Another object of the present invention is to provide a lens-fitted photographic film unit having a packaging of which the integrity is improved and which can be handled with ease.

SUMMARY OF THE INVENTION

In order to achieve the above and other objects and advantages of this invention, a lens-fitted photographic film unit is pre-loaded with photographic film and provided with photograph-taking means assembled therein. A film housing encloses the photographic film and the photograph-taking means. A protuberant portion is formed which protrudes beyond the rest of the film housing. A packaging covers the film housing at least partially. A deformed portion of the packaging is deformed to project outwardly, and is fitted on the protuberant portion.

A cassette is contained in the film housing with its axis vertical and disposed near an end of the film housing, and contains the exposed film. The protuberant portion and the deformed portion are curved about the outside of the cassette, to be usable as a grip.

At least one cut is formed in the packaging, adjacent at least one horizontal side of the deformed portion, in order to expose a part of the protuberant portion.

In a preferred embodiment, the film housing has a first color. A colored portion is formed on the packaging and at least on an edge of the cut to have substantially the first color. The colored portion includes the entirety of the deformed portion.

In a method of producing a lens-fitted photographic film unit, a protuberant portion is formed on the outside of the film housing. At least a portion of the packaging is subjected to press molding, for deformation so as to project outwardly. The packaging is mounted around the film housing, while fitting the press molded portion on the protuberant portion.

Therefore, the protuberant cassette portion of the photo film unit is easy to cover within a cardboard packaging. It is thus possible to enjoy the convenience of the photographic film unit having a considerably reduced depth. The integrity of the packaging is improved and the film unit can be handled with ease.

Should the packaging lack a deformed portion and have an opening through which the protuberant cassette portion is exposed, the protuberant cassette portion would be used as grip to be held directly. There would then be a problem in that an accidental tear in the cardboard might be created at the edge of the opening during use of the film unit. However, the packaging of the present invention has no such problem because there is no opening surrounding the protuberant portion.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS

Figure 1:
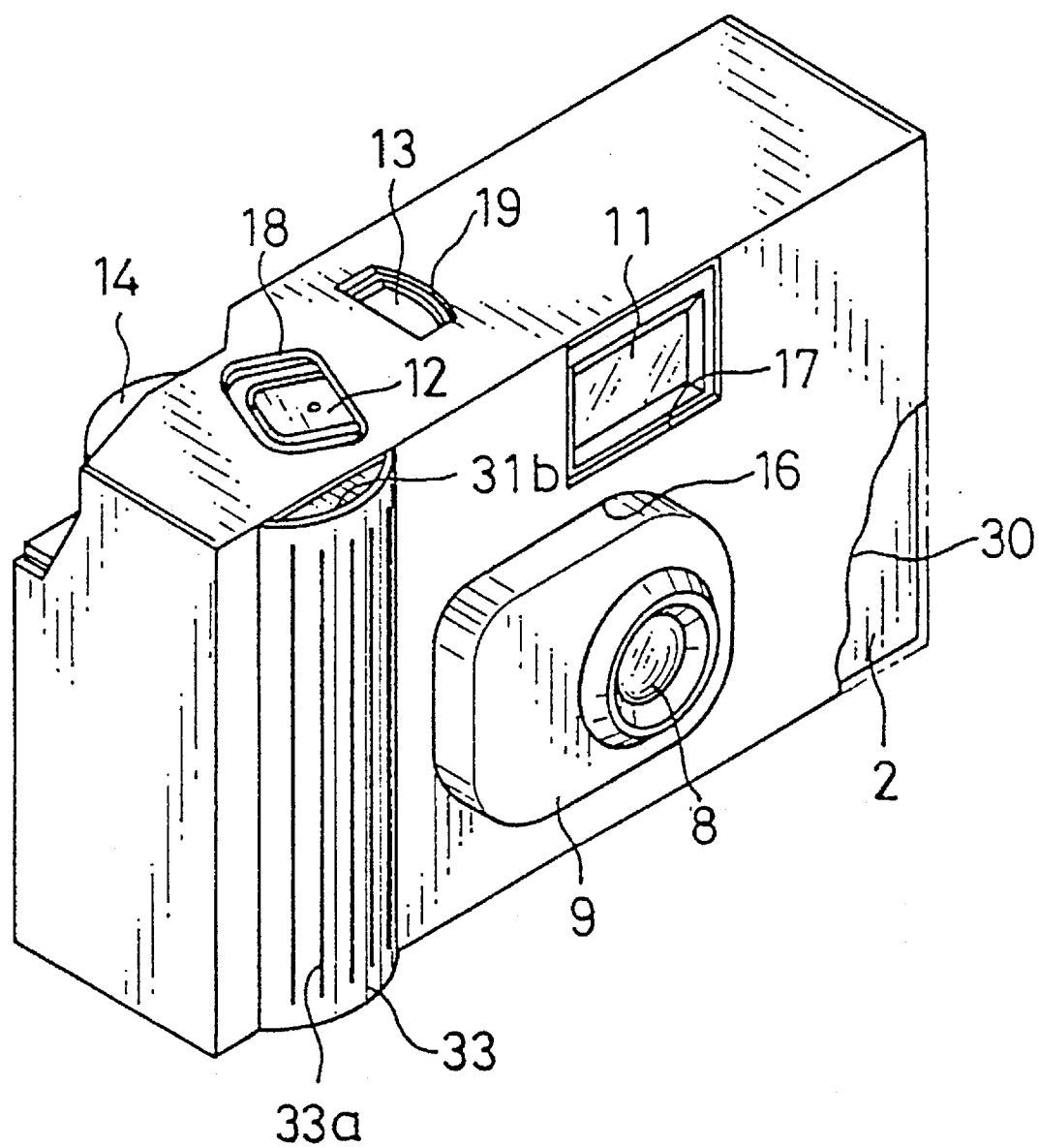
FIG. 1 is a perspective view illustrating a lens-fitted photographic film unit according to the present invention.
Figure 2:
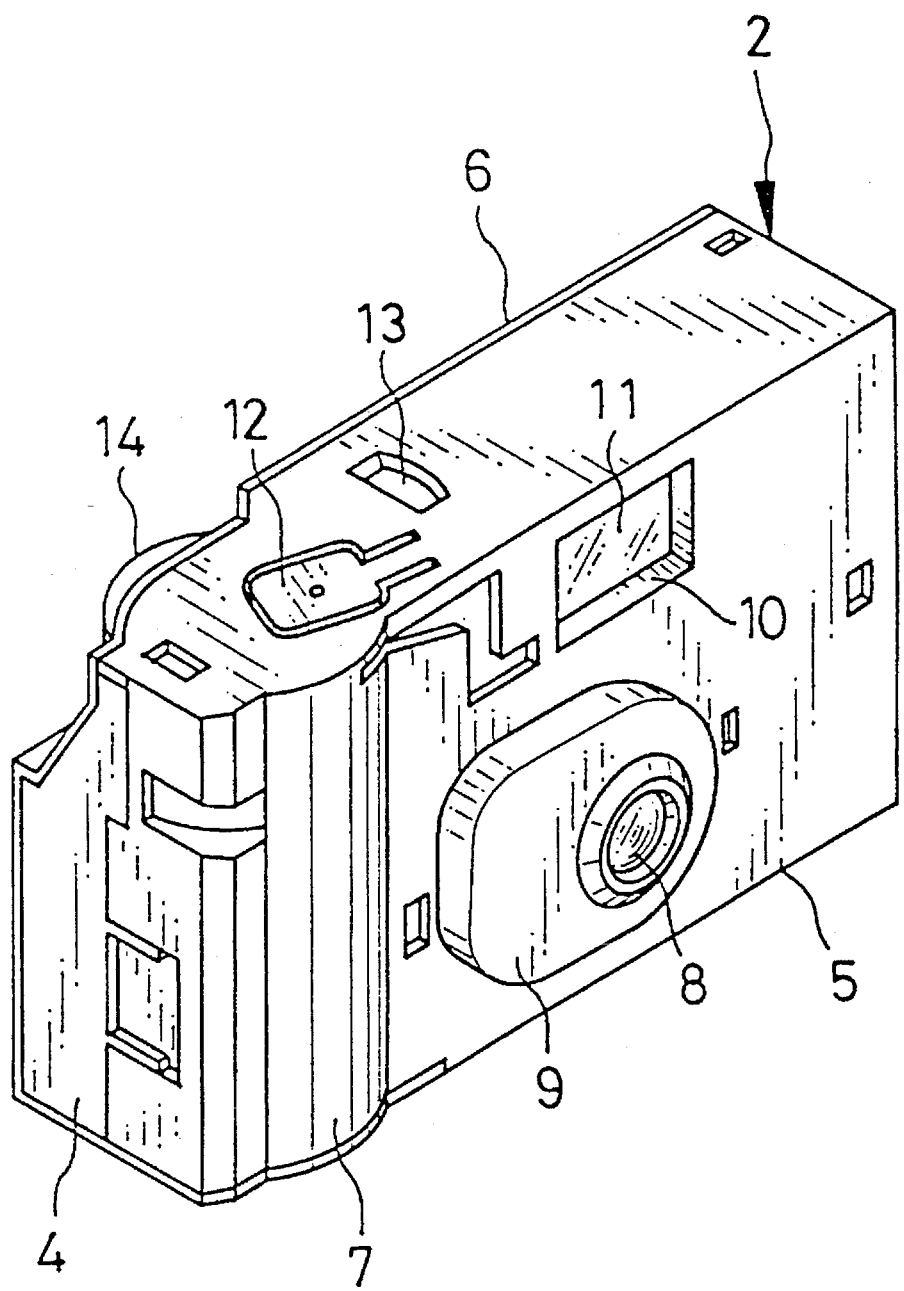
FIG. 2 is a perspective view illustrating a film housing adapted to be packaged in the film unit of FIG. 1.
Figure 3:
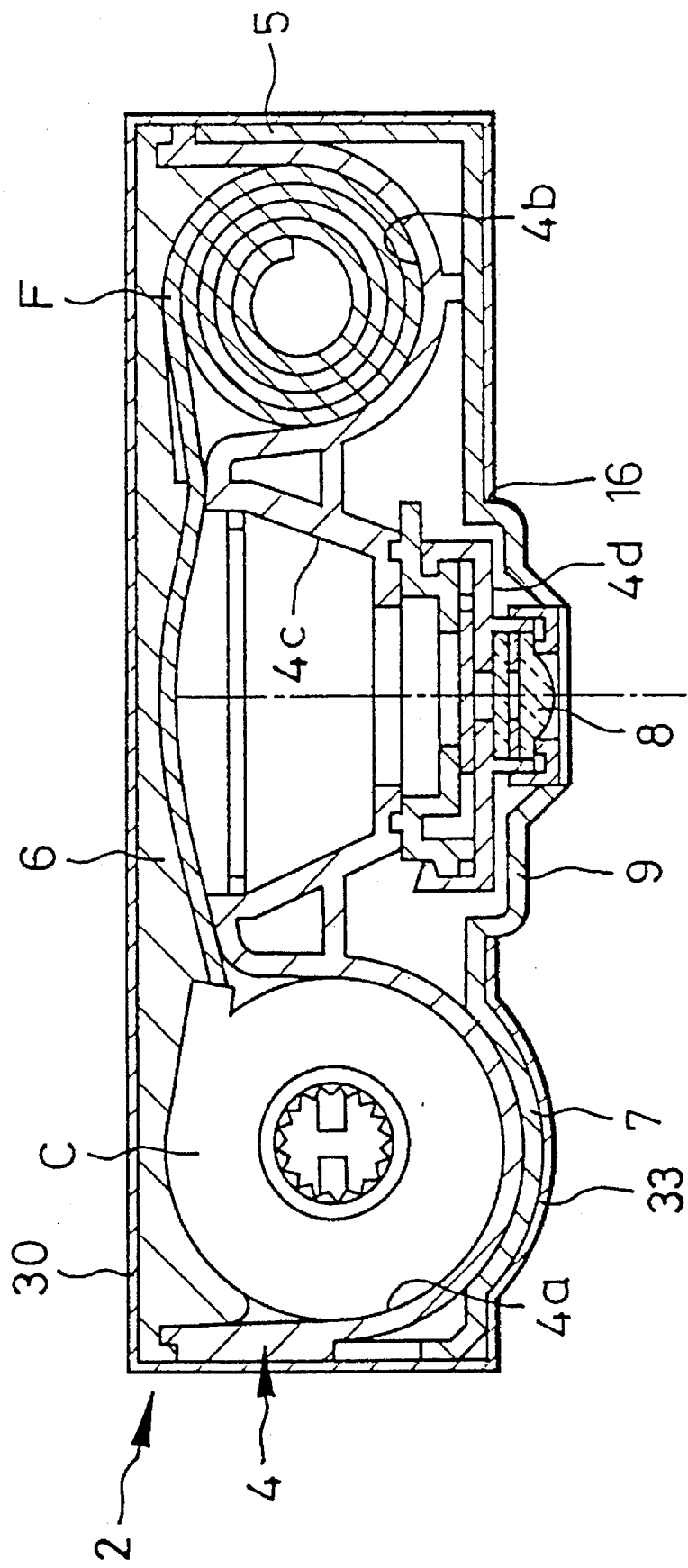
FIG. 3 is a horizontal section illustrating the photographic film unit.

In FIG. 1, a novel lens-fitted photographic film unit is constituted by a film housing 2 within a cardboard packaging 30. The film housing 2 is shaped as illustrated in FIGS. 2 and 3. The film housing 2 consists of a main body 4, and front and rear covers 5 and 6 secured to the main body 4 by use of hooks in cooperation with holes that receive the hooks. The main body 4 has a cassette-containing chamber 4a and a film supply chamber 4b, of which the former contains a cassette C, and the latter contains unexposed photographic film F that has been drawn out of the cassette C and wound in a roll. The main body 4 also includes a shutter mechanism and a one-frame winding mechanism. The front of the cassette containing chamber 4a is cylindrical and projects forwardly. To cover the cassette containing chamber 4a, the front cover 5 is provided with a protuberant portion 7, which is located to the right as viewed by the user holding the film unit. The main body 4 also has an exposure chamber 4c behind which an imaging frame is created on the film F, and incorporates an exposure section 4d in front of the exposure chamber 4c for defining a light path from a subject toward the film F.

The film housing 2 has a small depth between the rear and the front, and has the partly cylindrical protuberant portion 7 disposed to cover the front of the contained cassette C (see FIG. 3) while projecting forwardly beyond the thin portion of the film housing 2. The main body 4 and the front and rear covers 5 and 6 are generally formed of resin colored black, for the purpose of preventing ambient light from entering the inside of the film housing 2, and for avoiding diffused reflection of subject light in the light path through the exposure chamber 4c and the exposure section 4d, inside the main body 4 and in front of the rear cover 6.

The exposure section 4d includes a shutter mechanism and supports a taking lens 8. The front cover 5 of the film housing 2 has a central protuberant portion 9 surrounding the taking lens 8 to cover the front of the exposure section 4d while projecting forwardly beyond the thin part of the film housing 2.

In the front cover 5 is formed a finder window 10. A finder lens 11 is mounted on the main body 4, and appears through the finder window 10. A depressible portion 12 serving as a shutter release button is formed on the top of the front cover 5. A counter window 13 is also formed in the front cover 5. Reference numeral 14 designates an operable winding wheel, which is operated to wind the film F frame by frame back into the cassette C.

Figure 4:
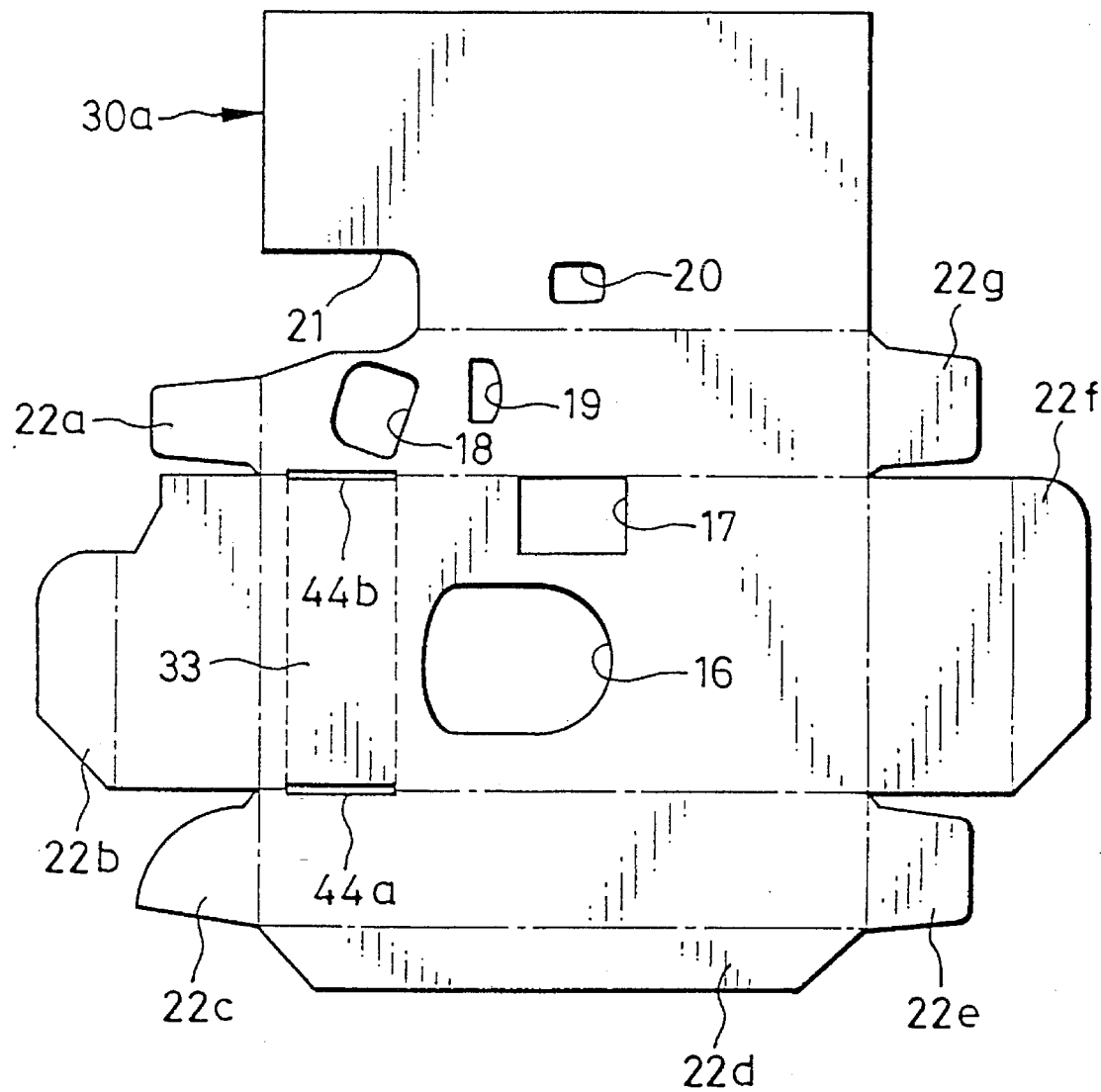
FIG. 4 is a plan view illustrating a sheet for packaging of the film unit.

As illustrated in FIG. 4, the packaging 30 widen flattened out consists of a sheet 30a, in which openings 16 to 20 and a cut-out 21 are formed. In the opening 16, the central protuberant portion 9 is received. Through the opening 17, the finder lens 11 is exposed. In the opening 18, the release button portion 12 is exposed so as to be operable externally. Through the opening 19, the counter window 13 is visible. In the cutoff 21, the winding wheel 14 is disposed so as to be accessible externally. The sheet 30a also has tabs 22a to 22g, which are adhered inside associated faces of the packaging 30.

For the sheet 30a to receive the film housing 2 despite the projecting shape of the protuberant portion 7, there are formed slits 44a and 44b in the sheet 30a. The slits 44a and 44b have a length equal to or slightly greater than the horizontal width of the protuberant portion 7, and are formed within the contours of the sheet 30a without extending to the periphery of the sheet 30a. A four-sided portion 33 to be curved is defined between the slits 44a and 44b and between two bending lines along which the sheet 30a is bent inwardly, as indicated by the broken lines. The interval between the bending lines is equal to the length of the slits 44a and 44b. To manufacture sheet 30a, sheet material is first printed to have commercial decorative matter, before the sheet 30a is cut out of the sheet material. The slits 44a and 44b are formed simultaneously with the cutting out of the sheet 30a.

Note that the slits 44a and 44b are defined as respective single lines without width. The slits 44a and 44b are depicted in FIG. 4 as having an appreciable width only for ease of understanding.

The sheet 30a cut out as shown in FIG. 4 is supplied to an automatic packaging apparatus, to which the film housing 2 after assembly is also supplied. The dot-dash-lines in FIG. 4 represent bending lines. The sheet 30a is bent along those lines in preliminary fashion in the packaging apparatus, for the purpose of providing folds for the sheets 30a before covering the film housing 2.

Figure 5:
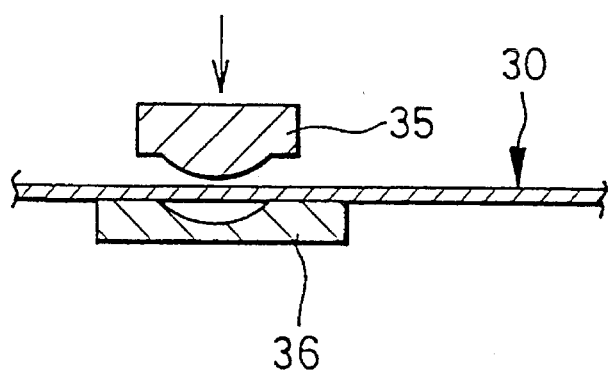
FIG. 5 is an explanatory view illustrating a pair of molds with the packaging sheet to be pressed between them.

As can be seen in FIG. 5, in an upstream station, a male mold 35 and a female mold 36 are arranged in opposition along the path of the sheet 30a. The male mold 35 has a partly cylindrical convex shape. The female mold 36 has a partly cylindrical concave shape. When the sheet 30a is brought between the molds 35 and 36, the four-sided portion 33 is positioned on the convex portion of the male mold 35, which is pushed against the female mold 36 to press the four-sided portion 33 to curve it outwardly. The sheet 30a is then bent inwardly along the broken lines.

After this pressure molding, the four-sided portion 33 projects above the flat sheet 30a a distance in a range from 2 to 3 mm. The molds 35 and 36 have faces that are smoothly cylindrical without unevenness. Alternatively, the female mold can have a plurality of projecting ridges parallel to the generatrix of the cylinder, so as to provide a front face of the four-sided portion 33 with a plurality of grooves 33a parallel to the generatrix. This facilitates curving the four-sided portion 33, and improves the photographer's grip on the film unit, when the four-sided portion 33 is grasped. Note that the male mold may further have a plurality of ridges and/or grooves. It is also preferable in the course of the above pressure molding to apply high frequency or ultrasound waves to the four-sided portion 33 to heat it.

After curving the four-sided portion 33, the sheet 30a is bent along the depicted dot-dash-lines. Adhesive agent is applied to the tabs 22a to 22g. The sheet 30a is formed into the packaging 30 of a box shape. With the packaging 30 halfway finished, the film housing 2 is inserted into the packaging 30. A rear portion of the packaging 30 is finally adhered to a bottom portion by adhering the tab 22d, so as to obtain the film unit as a product. The protuberant portion 7 is tightly covered by the four-sided portion 33, and is used as a grip for the film unit. The slit 44b is spread to be an opening 31b above the four-sided portion 33 and the slit 44a is similarly spread to provide an opening below portion 33, through which openings the protuberant portion 7 partially appears.

Note that it is desirable while pressing the four-sided portion 33 to support the overall peripheral portions around the sheet 30a in stable fashion, so as to avoid breakage, deformation and wrinkles in the periphery of the sheet 30a. It is also desirable to form the slits 44a and 44b to be spaced 3 mm or more from both of the openings 16 and 18.

Figure 6:
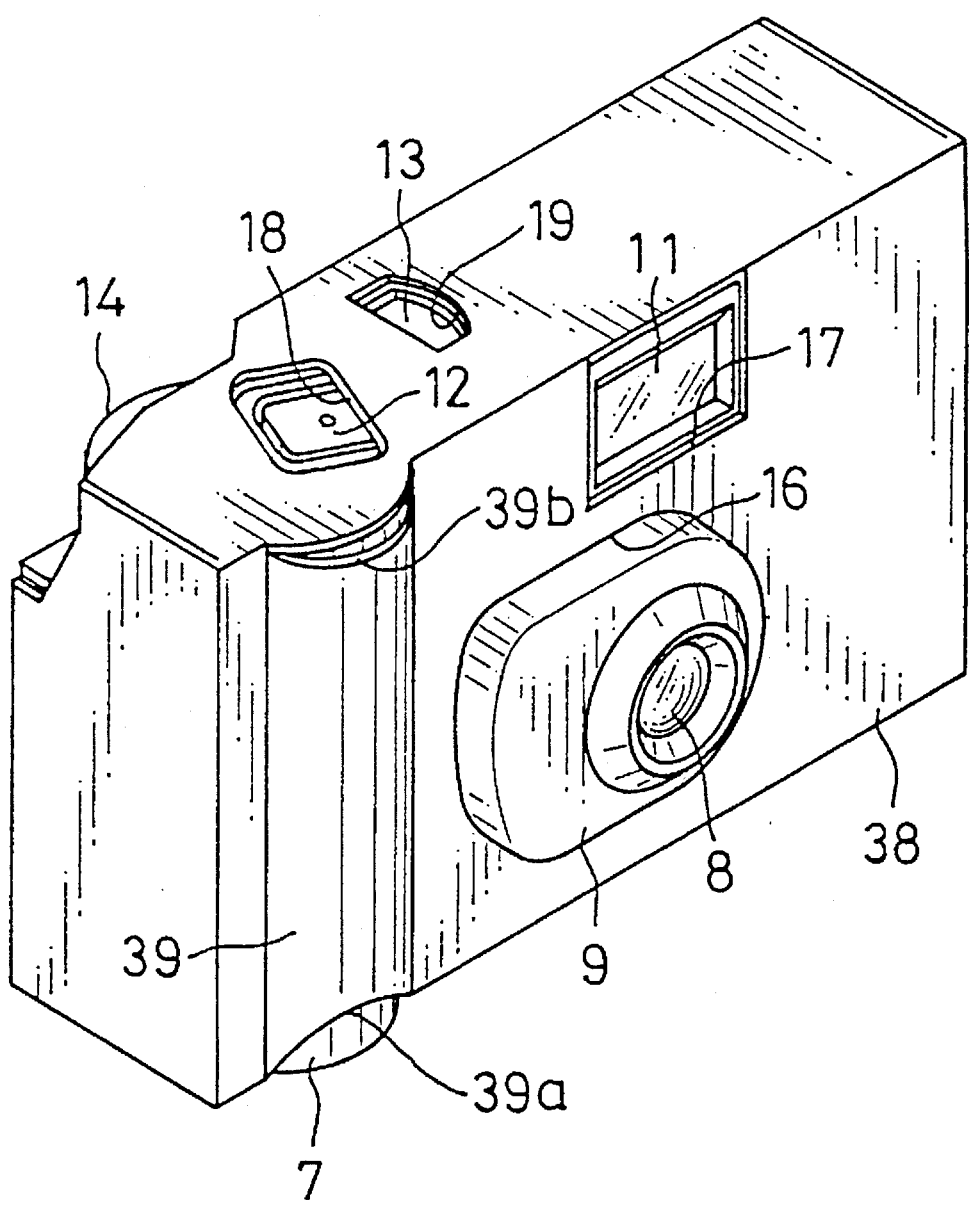
FIG. 6 is a perspective view of another preferred photographic film unit in which curved cuts are formed in the packaging.
Figure 7:
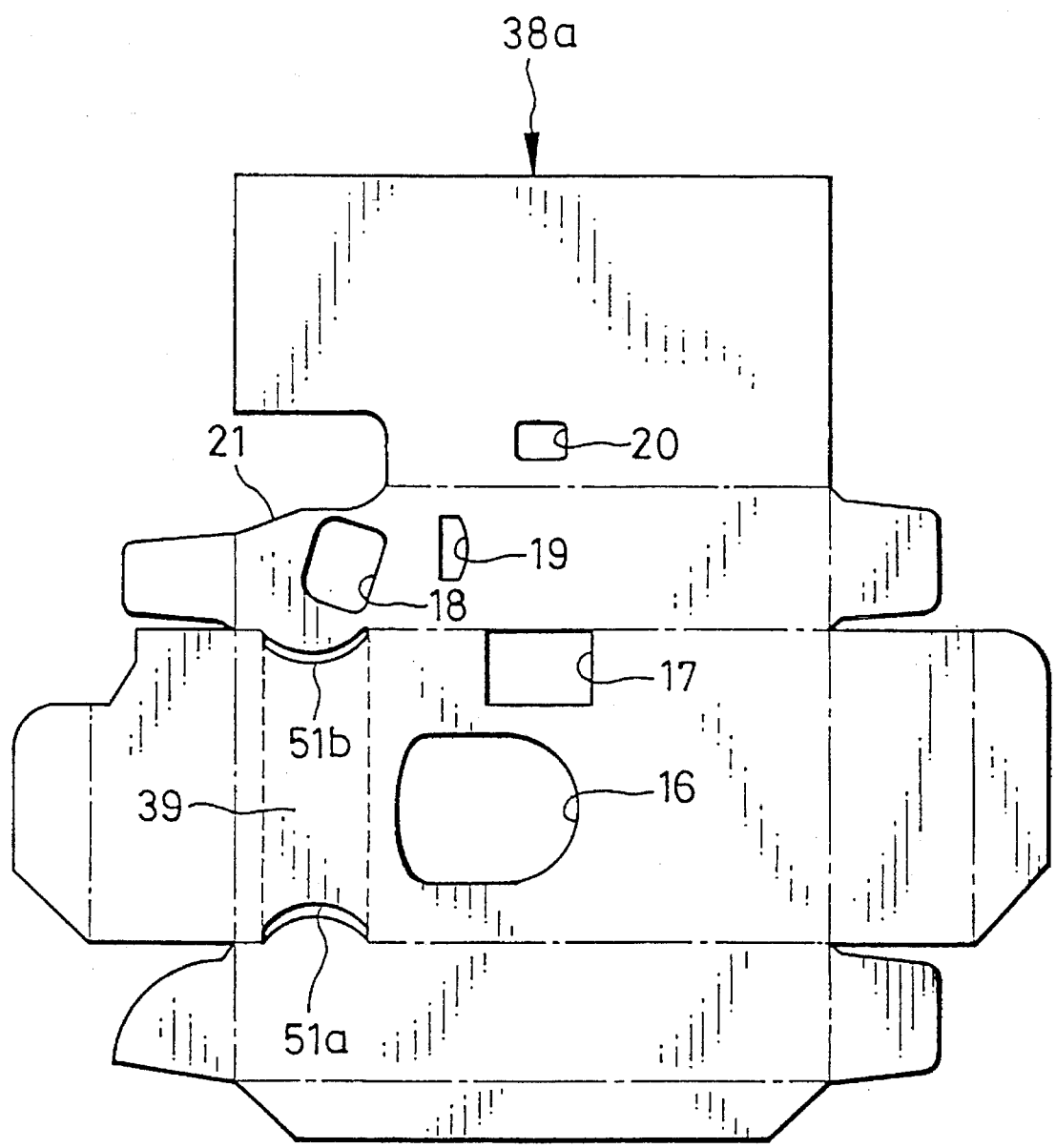
FIG. 7 is a view similar to FIG. 4 but showing the embodiment of FIG. 6.

FIGS. 6 and 7 illustrate another preferred packaging 38 constituted of a sheet 38a. Two arcuate cuts 51a and 51b are formed in the sheet 38a, and define a quasi-four-sided portion 39, which is pressed in the same manner as above. There are thus formed openings 39a and 39b next to the quasi-four-sided portion 39 through which the protuberant portion 7 partially appears. Note that the cuts 51a and 51b are defined as respective single curves without width. The width of the cuts 51a and 51b as depicted in FIG. 7 is only for ease of understanding.

Figure 8:
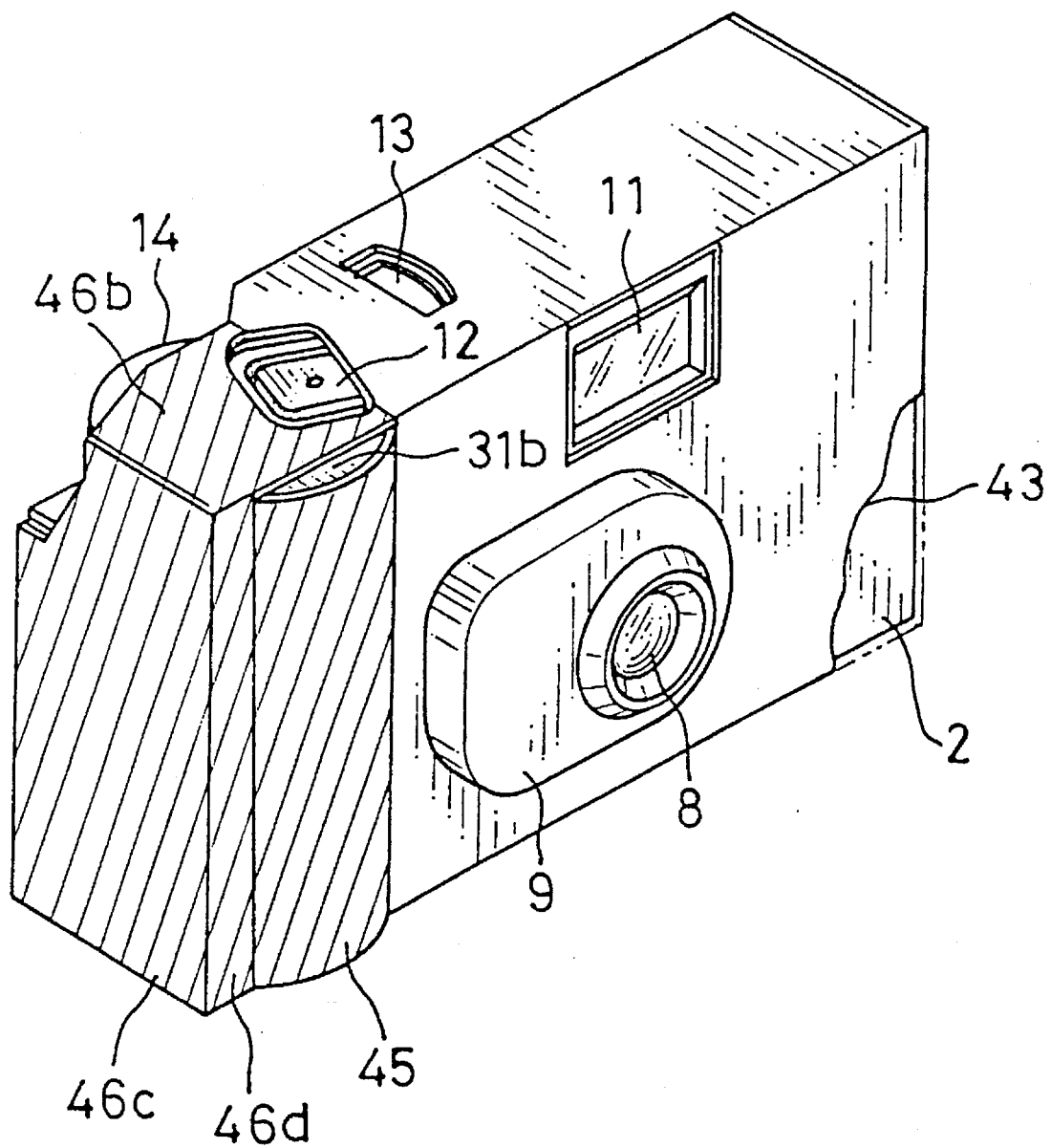
FIGS. 8 and 9 are views similar to FIGS. 6 and 7, respectively, but of another embodiment of a film unit of which the grip is of a dark color, e.g. black.
Figure 9:
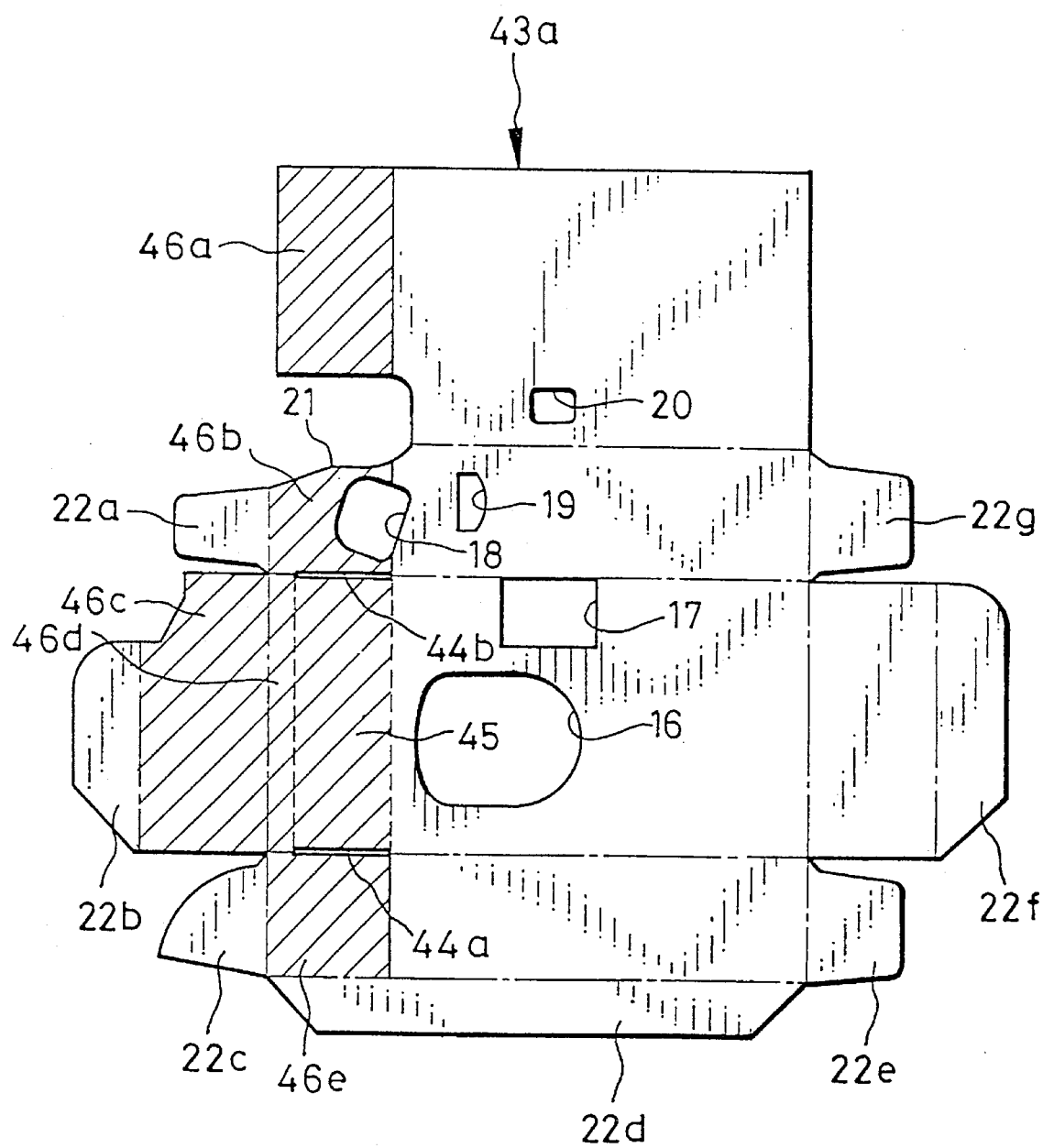

FIGS. 8 and 9 illustrate a further preferred packaging 43, of which a four-sided portion 45 between the slits 44a and 44b is printed to be dark, e.g. black, on a sheet 43a. Around the four-sided portion 45 are formed black-printed portions 46a to 46e, which are located, when the sheet 43a is formed into the packaging 43, around the cassette containing chamber 4a, so that the right end of the film unit, as viewed by the photographer holding the film unit, is generally colored black. Portions of the surface of the film unit not colored black are printed in other colors such as green, and provided with patterns or decoration convenient for commercial distribution.

The protuberant portion 7 is received in the four-sided portion 45. The slit 44b is spread to an opening 31b, through which the protuberant portion 7 partially appears. The four-sided portion 45 and the black-printed portions 46b and 46d have the same color as the black protuberant portion 7, and impart a desirable unitary appearance to the grip of the film unit, and make it easier for the photographer to hold the photo film unit without slippage.

Figure 10:
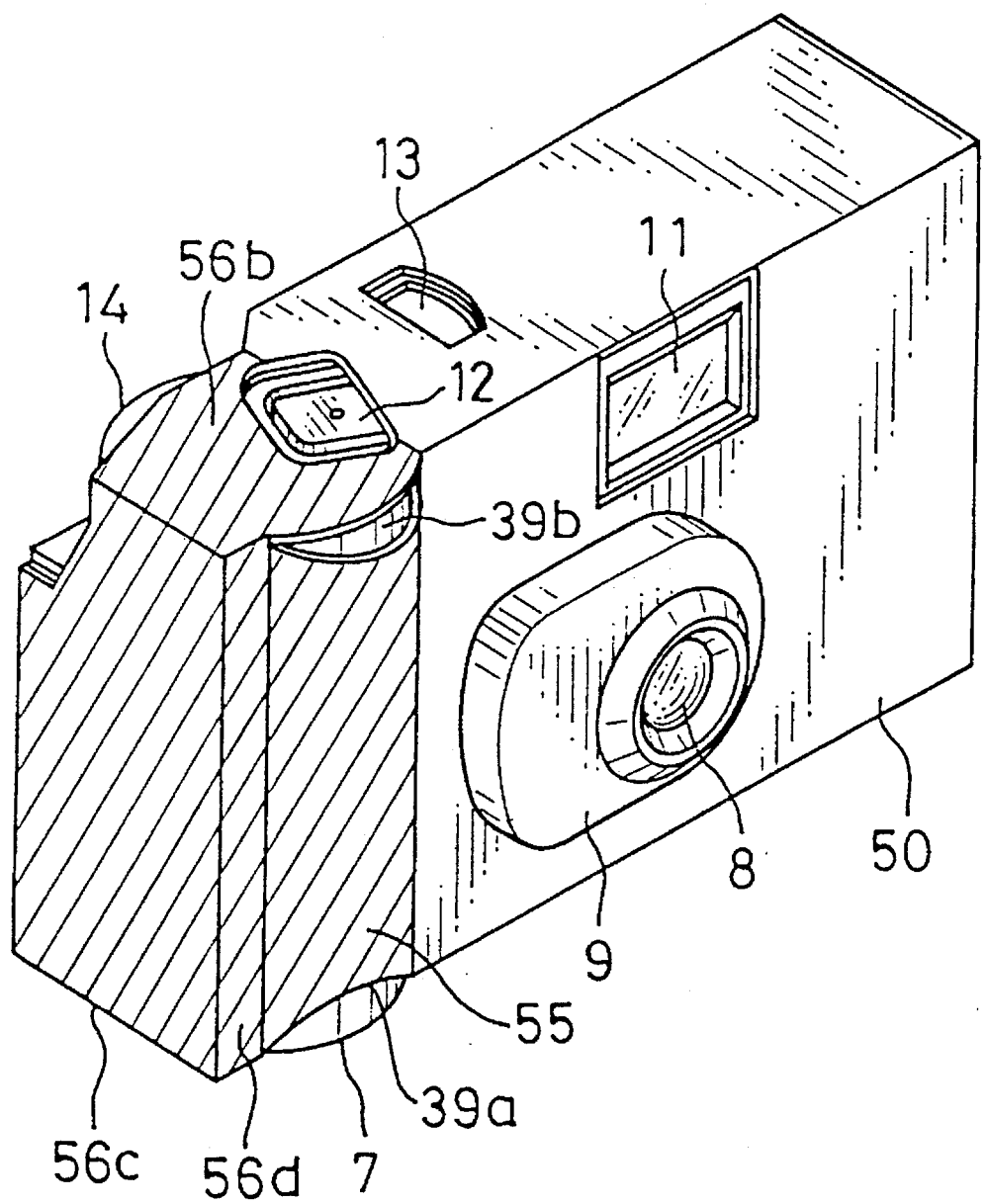
FIGS. 10 and 11 are views similar to FIGS. 8 and 9, respectively, but in which curved cuts are formed in the packaging.
Figure 11:
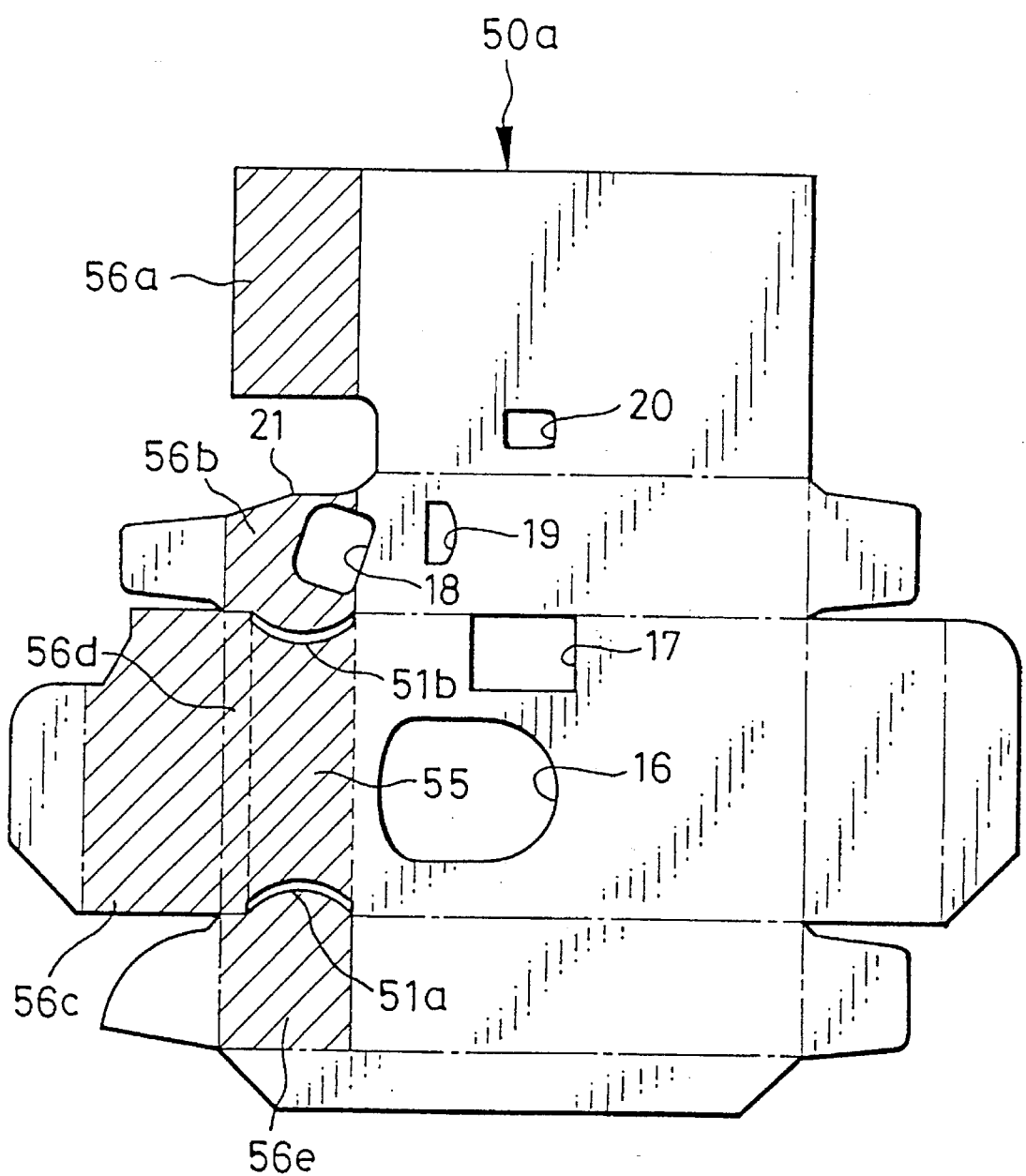

FIGS. 10 and 11 illustrate still another preferred packaging 50 constituted of a sheet 50a. The two curved cuts 51a and 51b are formed in the sheet 50a, and define a quasi-four-sided portion 55, which is pressed in the same manner as above. There are thus formed openings 39a and 39b next to the quasi-four-sided portion 55 through which the protuberant portion 7 partially appears partly in the same color as the quasi-four-sided portion 55 and the black printed portion 56a to 56e.

In the above embodiment, the film housing 2 and the four-sided portions 45 and 55 are colored black. Alternatively, the film housing 2 may be colored to have a different dark color, by which light is highly absorbable. The four-sided portions 45 and 55 may be colored the same dark color. In the above embodiment, the front cover 5 has the same color as the main body 4 and the rear cover 6. The front cover 5 may have any color different from the dark color of the main body 4 and the rear cover 6.

In the above embodiment, the four-sided portions 45 and 55, the top printed portions 46b and 46e and the bottom printed portions 56b and 56e are all black. Alternatively, the four-sided portions and other adjacent portions may be partially colored black, so as to color the edges of the slits or cut the same color as the protuberant portion 7.

Figure 12:
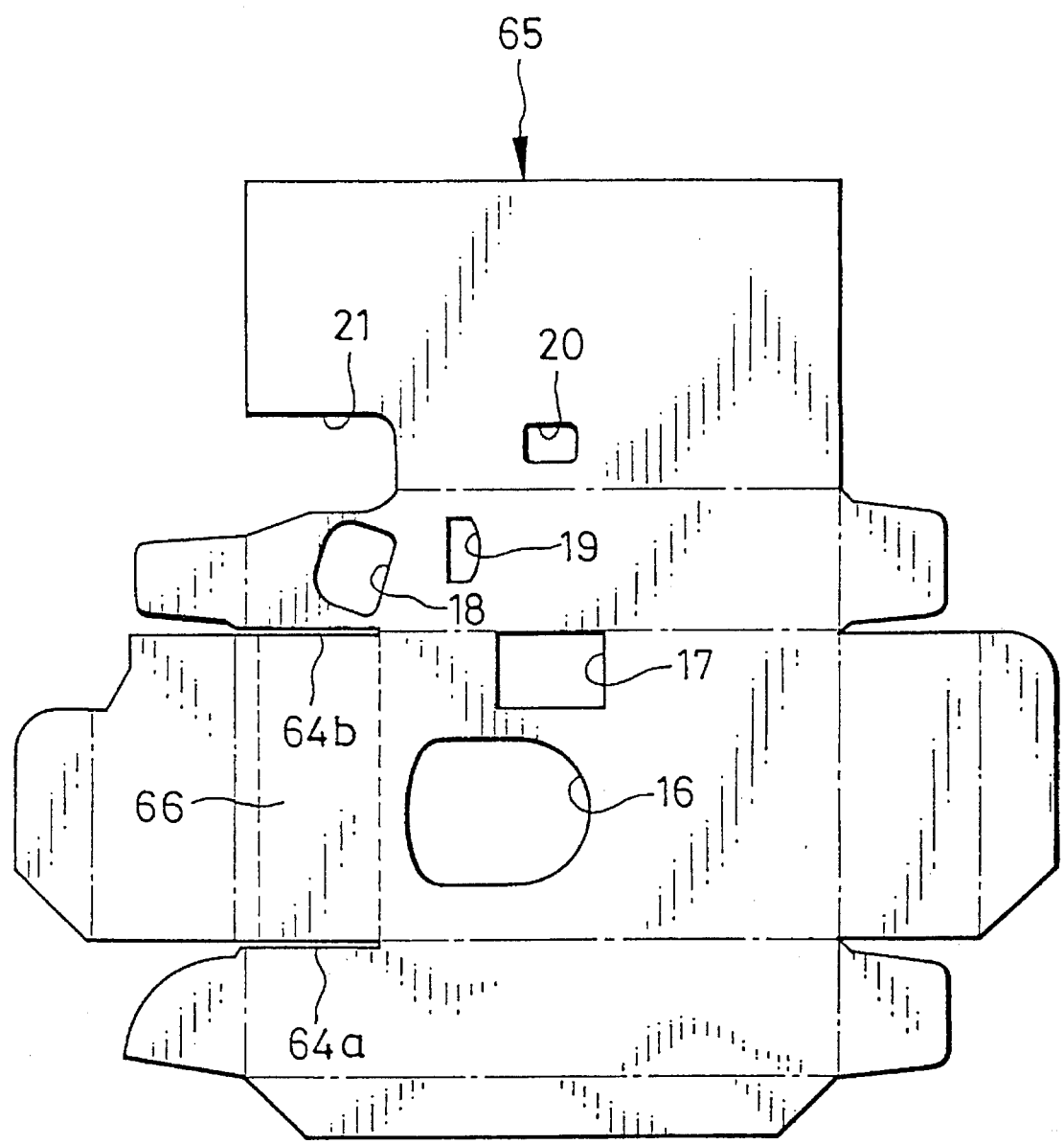
FIG. 12 is a plan view illustrating another embodiment of a sheet for packaging the film housing.

FIG. 12 illustrates a comparable example of a sheet 65 for constituting a packaging, in which slits 64a and 64b are formed. The slits 64a and 64b have a length greater than the horizontal width of the cassette protuberant portion 7, and extend to the periphery of the sheet 65. A four-sided portion 66 to be curved is defined between the slits 64a and 64b and between the two broken lines along which the sheet 65 is to be bent inwardly. The covering portion 66 is curved and fitted on the cassette protuberant portion 7.

There is, however, a problem in that the slits 64a and 64b are formed so long that the integrity or strength of the sheet 65 is reduced. The long slits 64a and 64b define a flap between them, which may be pulled and torn accidentally in the course of transportation and/or automatic packaging. The sheet 65 can tear along either slit, and therefore is difficult to handle safely. The flap comprised by the four-sided portion 66 is rounded cylindrically. However there is a danger that looseness may develop between the four-sided portion 66 and the protuberant portion 7 in the course of using the film unit, which in that case could not be kept packaged stably.

In the present invention, the slits 44a, 44b and the cuts 51a, 51b do not extend to the periphery of the sheet 30a, 38a, 43a, 50a, so that the packaging 30, 38, 43, 50 is prevents from being weakened, while the four-sided portion 33, 39, 45, 55 is shaped to be round by pressing the sheet 30a, 38a, 43a, 50a. The slits 44a, 44b and the cuts 51a, 51b define no vulnerable flap to be pulled accidentally in the course of transportation, avoid tearing the sheet 30a, 38a, 43a, 50a and facilitate handling of the sheet 30a, 38a, 43a, 50a even during transportation. The four-sided portion 33, 39, 45, 55 is pressed to have a nearly permanent curve. There is no possibility of looseness between four-sided portion 33, 39, 45, 55 and the protuberant portion 7 in the course of use of the film unit, which can therefore be kept packaged stably.

In the above embodiment, the automatic packaging apparatus bends the sheet 30a, 38a, 43a, 50a in a preliminary fashion, performs the pressure molding of the four-sided portion 33, 39, 45, 55 and then packages the film housing 2 within the packaging 30, 38, 43, 50. Alternatively, an automatic packaging apparatus may package the film housing 2 in the packaging 30, 38, 43, 50 which is supplied from a separate apparatus in which the sheet 30a, 38a, 43a, 50a is bent preliminarily and pressed to render arcuate the four-sided portion 33, 39, 45, 55.

The process of pressing the four-sided portion 33, 39, 45, 55 can be performed nearly simultaneously with cutting the sheet 30a, 38a, 43a, 50a from the sheet material. Otherwise, the four-sided portion 33, 39, 45, 55 can be pressed after having cut the sheet 30a, 38a, 43a, 50a out of the sheet material.

In the above embodiments, the two slits 44a and 44b or cuts 51a and 51b are formed in the respective sheets 30a, 38a, 43a, 50a for the packagings. Alternatively, it is possible to form only one slit or cut, or no cut, in a sheet for packaging. A four-sided portion on the sheet may be pressed without cuts, and formed to be fitted on the protuberant portion 7 of the film housing 2. It is desirable during the pressure molding of the four-sided portion, particularly with one cut or without any cut, to apply high frequency or ultrasonic waves, as is described above, to heat the four-sided portion. The four-sided portion, prior to application of high frequency or ultrasonic waves, may be supplied with moisture, to aid in curving the four-sided portion.

In the above embodiments, a sheet 30a, 38a, 43a, 50a of cardboard is used for the packaging 30, 38, 43, 50. Alternatively, the packaging sheet can be formed of resin. Without slits or cuts, the resinous sheet can be formed into the partly curved packaging, with great ease by application of heat and pressure.

In the above embodiments, the protuberant portion 7 associated with the periphery of the cassette C is covered by the packaging 30, 38, 43, 50 without looseness. Furthermore, other protuberant portions on a film housing can be covered in a sheet-formed packaging according to the present invention, such as the central protuberant portion 9 around the taking lens 8, and protuberant portions formed on a front or top of the film housing for various purposes. It is preferred not to form any cut around a four-sided portion for the central protuberant portion 9.

Material for the cardboard packaging is selected for facility in the pressure molding. An example of easily press-moldable material is polyethylene (PE) coated paper, which is constituted by base paper and polyethylene films laminated on both faces of the base paper. The PE-coated paper has a high quality and good integrity.

Note that the use of PE-coated paper has an additional advantage in facilitating the recycling of the base paper. When disassembled and emptied, used photo film units are collectively withdrawn together with packagings of PE-coated paper, and the packagings are removed from the film housings. The PE films laminated on the packagings are then removed from the base paper, by utilizing the performance of the PE-coated paper, which is easy to peel off the laminated construction. Therefore, the base paper can be collectively withdrawn and recycled with great ease.

Although the present invention has been fully described by way of preferred embodiments thereof with reference to the accompanying drawings, various changes and modifications will be apparent to those having skill in this field. Therefore, unless otherwise these changes and modifications depart from the scope of the present invention, they should be construed as being included therein.

What is claimed is:

1. A method of producing a lens-fitted photographic film unit constituted by a film housing and a packaging for covering said film housing at least partially, said film housing being preloaded with photographic film and a cassette for receiving said film and having a photograph-taking means assembled therein, comprising the steps of:

forming a protuberant portion on the outside of said film housing;

disposing a said cassette in said protuberant portion of said film housing with its axis upright;

subjecting at least a portion of said packaging to pressure molding, for deforming a portion of said packaging to project outwardly; and mounting said packaging around said film housing, while fitting said pressure-molded portion onto said protuberant portion.

2. A method as defined in claim 1, comprising the further steps of:

cutting a single sheet member out of sheet material in such form that said film housing is packageable therein;

bending said sheet member;

covering said film housing with said sheet member, after said pressure molding and after said bending of said sheet; and adhering said sheet member to itself while covering said film housing, so as to constitute said packaging.

3. A method as defined in claim 2, wherein said sheet member is preliminarily bent and is then subjected to said pressure molding, and is afterwards fully bent to constitute said packaging.

4. A producing method as defined in claim 1, comprising the further step of forming at least one cut in said packaging, at at least one horizontal side of said pressure-molded portion, in order to expose a part of said protuberant portion.

5. A method as define din claim 4, comprising the further steps of:

coloring said film housing to have a first color; and coloring at least an edge of said cut on said packaging to have substantially said first color.

6. A method as defined in claim 5, wherein said packaging is a cutout sheet member and said edge of said cut is colored before said sheet member is cut out.

7. A method as defined in claim 1, comprising the further step of forming a plurality of linear grooves in said pressure-molded portion along a generatrix of said pressure-molded portion.

* * * * *